Jan. 22, 1929.
W. SCOTT
1,699,548
RELEASE SPRING
Filed April 27, 1927
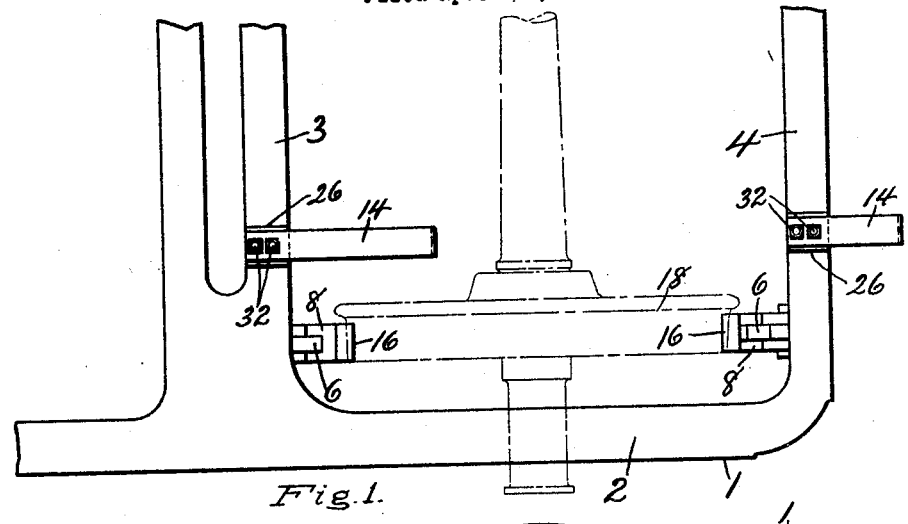
Fig.1.
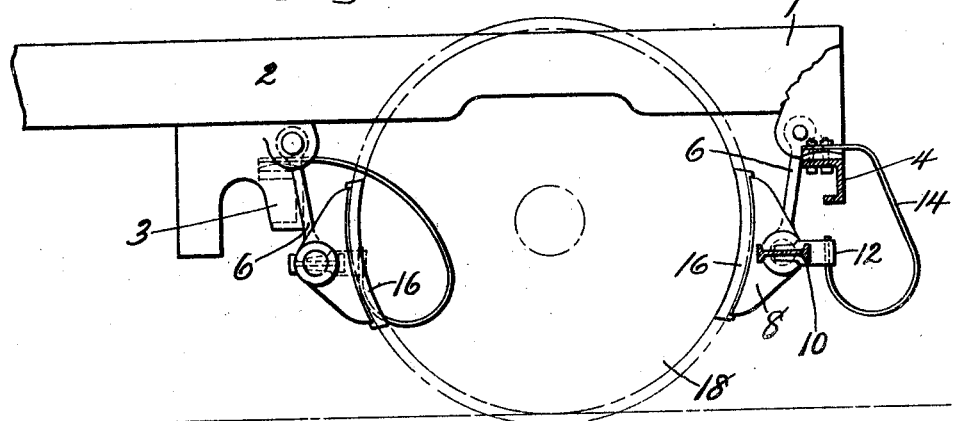
Fig.2.
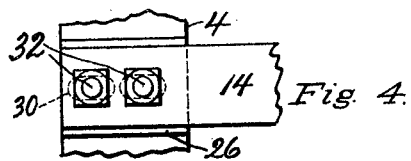
Fig. 3.
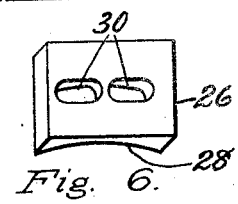
Fig. 4.
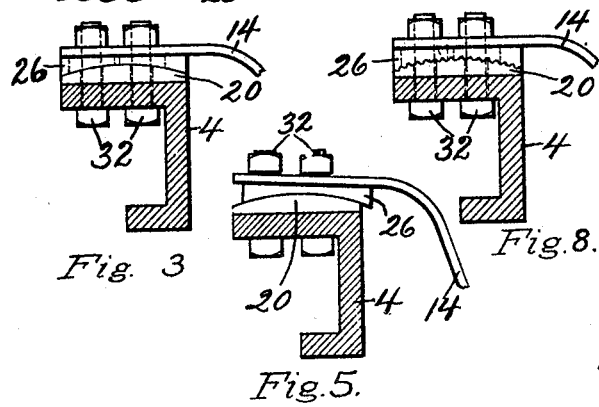
Fig.5. Fig.8.
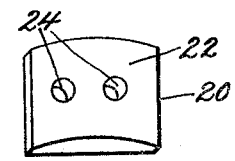
Fig. 6.
Fig. 7
INVENTOR
Walter Scott.
BY J. H. Gibbs
ATTORNEY.

Patented Jan. 22, 1929.

1,699,548

UNITED STATES PATENT OFFICE.

WALTER SCOTT, OF JEFFERSONVILLE, INDIANA, ASSIGNOR TO AMERICAN CAR AND FOUNDRY COMPANY, OF NEW YORK, N. Y., A CORPORATION OF NEW JERSEY.

RELEASE SPRING.

Application filed April 27, 1927. Serial No. 187,050.

Reference is had to the accompanying drawings which illustrate the preferred form of the invention, though it is to be understood that the invention is not limited to the exact details of construction shown and described, as it is obvious that various modifications thereof within the scope of the claims will occur to persons skilled in the art.

In said drawings:

Figure 1 is a partial top plan view of a car truck frame with brake release spring adjusting means constructed in accordance with this invention applied thereto;

Fig. 2 is a partial side elevation of the frame shown in Fig. 1, parts of the frame being broken away to show the spring adjusting means more clearly;

Fig. 3 is a fragmentary vertical section taken through an end piece or transom of the truck frame adjacent the spring adjusting means;

Fig 4 is a top plan view of the spring adjusting means applied to a car truck frame;

Fig. 5 is a view similar to Fig. 3 showing the spring adjusting means adjusted to a different position;

Figs. 6 and 7 are perspective views of the upper and lower blocks, respectively, of the adjusting means, and Fig. 8 is a view similar to Fig. 3 of a spring adjusting means of modified construction.

This invention relates to adjusting means for the release springs of car brakes, and it is an object of this invention to provide an improved adjusting means for release springs which operate brake beams or heads which will consists of few simple parts which may be economically manufactured and readily applied to either new or old trucks and which may be quickly adjusted and positively secured in adjusted position.

In the drawings the invention is shown applied to a car truck 1 illustrated somewhat diagrammatically and comprising a side frame 2, transom 3 and an end piece 4. To the transom 3 and end piece 4 links 6 are pivotally secured and pivotally support brake heads 8, the brake heads at the opposite sides of the truck being connected by beams 10. To the beams 10 are attached brackets 12 which are engaged by the overlapped ends of springs 14, the springs 14 being shown as oppositely disposed with respect to the brake beams 10 so that the springs operate in different directions in order to withdraw the brake shoes 16 from the wheel 18. To secure the springs to the transom 3 and end piece 4 there is provided a lower block 20 having its upper surface 22 curved and provided with bolt openings 24. Resting upon the curved face 22 of the block 20 is an upper block 26 having a lower face 28 of the same curvature as the face 22 of the block 20 and provided with elongated bolt openings 30, bolts 32 being provided which extend through openings in the transom 3 or end piece 4, through the openings in the blocks 20 and 26 and through openings in the upper ends of the springs 14 and secure the blocks and springs in position on the truck frame members.

Shifting the upper block 26 upon the lower block 20 will cause the spring 14 to be tilted with respect to the frame member 3 or 4 upon which it is supported and will cause the lower portion of the spring 14 to be brought either closer to or farther away from the bracket 12 on the beam 10. In this manner the position of the spring with respect to the beam may be adjusted so that when the spring 14 is engaged with the bracket 12 the proper tension will be placed upon the spring 14 for effecting the prompt release of the brake shoes 16 from the wheel 18. There is also provided a ready means for compensating for slight differences in shape or strength of the springs 14 which arise during manufacture and permitting of the proper tensioning of all springs irrespective of slight irregularities.

In the modified construction shown in Fig. 8, the engaging surfaces 22 and 28 of the upper and lower blocks respectively are formed with corrugations to increase the resistance to slippage of the upper block upon the lower block when the blocks are adjusted to a position such as is shown in Fig. 5.

What is claimed is:

1. In combination, a car truck frame member, a block on said frame member, a second block adjustably mounted on said first block and a brake release spring mounted on said second block.

2. In combination, a car truck frame member, a brake release spring and means for tilting said spring with respect to said frame member.

3. In combination, a car truck frame member, a brake release spring and adjustable means between said spring and frame member adapted to tilt said spring with respect to said frame member.

4. In combination, a car truck frame member, a brake release spring and a plurality of relatively adjustable blocks secured to the truck frame member for mounting the spring, said blocks having curved engaging faces.

5. In combination, a car truck frame member, a brake release spring and a plurality of relatively adjustable blocks secured to the truck frame member for mounting the spring, said blocks having corrugated curved engaging faces.

6. In combination, a car truck frame member, a brake release spring, a plurality of blocks between said spring and frame member and a bolt securing said blocks and spring to said frame member, one of said blocks having elongated bolt openings permitting relative adjustment of said blocks.

7. In combination, a car truck frame member, a brake release spring, a plurality of blocks having curved engaging faces between said spring and frame member and a bolt securing said blocks and spring to said frame member, one of said blocks having an elongated bolt opening permitting relative adjustment of said blocks and tilting of said spring with respect to said frame member.

8. In combination, a car truck frame member, a brake release spring secured to the frame member and means for tilting the spring with respect to said frame member to vary the tension of said spring.

9. In combination, a car truck frame member, a brake release spring, and adjustable means secured to the frame member for mounting the spring for tilting movement upon adjustment of said means.

10. In combination, a car truck frame member, a brake release spring, and means for mounting the spring comprising a plurality of relatively adjustable blocks secured to the frame member.

11. In combination, a car truck frame member, a brake release spring having an overlapping lower portion, and adjustable means connecting the upper end of said spring to the frame member for tilting the spring upon adjustment to vary the spring tension.

12. In combination with a brake release spring, means for tilting the same to vary the tension thereof comprising relatively adjustable blocks secured to a truck frame member and to which the spring is connected.

13. In a brake release spring having one end connected to a brake shoe, means for varying the tension of said spring comprising relatively adjustable blocks secured to a frame member and to which the spring is connected, relative movement of said blocks tilting the spring.

14. A brake release spring having a main portion and a lower portion overlapping said main portion, the end thereof being attached to a brake shoe, and adjustable means secured to a frame member and to which the end of the main portion is connected, for varying the distance between said main portion and said overlapped portion to vary the tension of said spring.

15. A brake release spring having a main portion and a lower portion overlapping said main portion and spaced therefrom, the end thereof being attached to a brake shoe, and adjustable means secured to a frame member and to which the end of the main portion is connected for varying the distance between said main portion and said overlapped portion to vary the tension of said spring.

In witness whereof I have hereunto set my hand.

WALTER SCOTT.